US011868089B2

(12) United States Patent
Funakawa et al.

(10) Patent No.: US 11,868,089 B2
(45) Date of Patent: Jan. 9, 2024

(54) WATCH COMPONENT AND WATCH

(71) Applicant: Seiko Epson Corporation, Tokyo (JP)

(72) Inventors: Takeo Funakawa, Chino (JP); Katsuo Takano, Kai (JP)

(73) Assignee: SEIKO EPSON CORPORATION

( * ) Notice: Subject to any disclaimer, the term of this patent is extended or adjusted under 35 U.S.C. 154(b) by 514 days.

(21) Appl. No.: 16/951,199

(22) Filed: Nov. 18, 2020

(65) Prior Publication Data

US 2021/0149343 A1 May 20, 2021

(30) Foreign Application Priority Data

Nov. 19, 2019 (JP) ................................ 2019-208553

(51) Int. Cl.

*G04B 15/14* (2006.01)
*G04B 15/08* (2006.01)
*G04B 13/02* (2006.01)

(52) U.S. Cl.

CPC ........... *G04B 15/14* (2013.01); *G04B 13/022* (2013.01); *G04B 15/08* (2013.01)

(58) Field of Classification Search

CPC ....... G04B 15/14; G04B 13/022; G04B 15/08
See application file for complete search history.

(56) References Cited

U.S. PATENT DOCUMENTS

2018/0150029 A1 5/2018 Shibuya et al.
2018/0314208 A1 11/2018 Shibuya et al.
2018/0335754 A1 11/2018 Shibuya et al.
2018/0356768 A1 12/2018 Shibuya et al.
2019/0076876 A1 3/2019 Shibuya et al.
2020/0133200 A1 4/2020 Nagasaka

FOREIGN PATENT DOCUMENTS

CH 711247 A2 * 12/2016 ......... B81C 1/00626
EP 3002637 A1 * 4/2016 ........... G04B 13/022
JP 2012167808 A * 9/2012
JP 2014051741 A * 3/2014
JP 2017-203651 A 11/2017
WO WO-2009104624 A1 * 8/2009 ............. G04B 15/14

* cited by examiner

*Primary Examiner* — Edwin A. Leon
*Assistant Examiner* — Kevin Andrew Johnston
(74) *Attorney, Agent, or Firm* — Harness, Dickey & Pierce, P.L.C.

(57) ABSTRACT

An escape wheel serving as a watch component that constitutes a drive mechanism of a watch includes a tooth portion, and a base mainly composed of silicon. A contact surface where the tooth portion makes contact with another component includes a recess.

18 Claims, 10 Drawing Sheets

| D(μm) | OIL RETENTION | MECHANICAL STRENGTH |
|---|---|---|
| 0.00 | C | E |
| 0.01 | C | E |
| 0.02 | B | E |
| 0.03 | B | E |
| 0.04 | B | E |
| 0.05 | A | E |
| 0.06 | A | E |
| 0.07 | A | E |
| 0.08 | A | E |
| 0.09 | A | E |
| 0.10 | A | E |
| 0.20 | A | E |
| 0.30 | A | E |
| 0.40 | A | E |
| 0.50 | A | E |
| 0.60 | A | E |
| 0.70 | A | E |
| 0.80 | A | E |
| 0.90 | A | E |
| 1.00 | A | E |
| 1.10 | A | F |
| 1.20 | A | F |
| 1.30 | A | G |
| 1.40 | A | G |
| 1.50 | A | G |

FIG. 7

| | | THICKNESS T (μm) | | | | | | | | | | | | | |
|---|---|---|---|---|---|---|---|---|---|---|---|---|---|---|---|
| ANGLE θ (°) | D(μm) | 50 | 60 | 70 | 80 | 90 | 100 | 110 | 120 | 130 | 140 | 150 | 160 | 170 | 180 |
| | 0.05 | 0.022 | 0.026 | 0.031 | 0.035 | 0.039 | 0.044 | 0.048 | 0.052 | 0.057 | 0.061 | 0.065 | 0.070 | 0.074 | 0.079 |
| | 0.10 | 0.044 | 0.052 | 0.061 | 0.070 | 0.079 | 0.087 | 0.096 | 0.105 | 0.113 | 0.122 | 0.131 | 0.140 | 0.148 | 0.157 |
| | 0.15 | 0.065 | 0.079 | 0.092 | 0.105 | 0.118 | 0.131 | 0.144 | 0.157 | 0.170 | 0.183 | 0.196 | 0.209 | 0.223 | 0.236 |
| | 0.20 | 0.087 | 0.105 | 0.122 | 0.140 | 0.157 | 0.175 | 0.192 | 0.209 | 0.227 | 0.244 | 0.262 | 0.279 | 0.297 | 0.314 |
| | 0.25 | 0.109 | 0.131 | 0.153 | 0.175 | 0.196 | 0.218 | 0.240 | 0.262 | 0.284 | 0.305 | 0.327 | 0.349 | 0.371 | 0.393 |
| | 0.30 | 0.131 | 0.157 | 0.183 | 0.209 | 0.236 | 0.262 | 0.288 | 0.314 | 0.340 | 0.367 | 0.393 | 0.419 | 0.445 | 0.471 |
| | 0.35 | 0.153 | 0.183 | 0.214 | 0.244 | 0.275 | 0.305 | 0.336 | 0.367 | 0.397 | 0.428 | 0.458 | 0.489 | 0.519 | 0.550 |
| | 0.40 | 0.175 | 0.209 | 0.244 | 0.279 | 0.314 | 0.349 | 0.384 | 0.419 | 0.454 | 0.489 | 0.524 | 0.559 | 0.593 | 0.628 |
| | 0.45 | 0.196 | 0.236 | 0.275 | 0.314 | 0.353 | 0.393 | 0.432 | 0.471 | 0.511 | 0.550 | 0.589 | 0.628 | 0.668 | 0.707 |
| | 0.50 | 0.218 | 0.262 | 0.305 | 0.349 | 0.393 | 0.436 | 0.480 | 0.524 | 0.567 | 0.611 | 0.655 | 0.698 | 0.742 | 0.785 |
| | 0.55 | 0.240 | 0.288 | 0.336 | 0.384 | 0.432 | 0.480 | 0.528 | 0.576 | 0.624 | 0.672 | 0.720 | 0.768 | 0.816 | 0.864 |
| | 0.60 | 0.262 | 0.314 | 0.367 | 0.419 | 0.471 | 0.524 | 0.576 | 0.628 | 0.681 | 0.733 | 0.785 | 0.838 | 0.890 | 0.943 |
| | 0.65 | 0.284 | 0.340 | 0.397 | 0.454 | 0.511 | 0.567 | 0.624 | 0.681 | 0.737 | 0.794 | 0.851 | 0.908 | 0.964 | 1.021 |
| | 0.70 | 0.305 | 0.367 | 0.428 | 0.489 | 0.550 | 0.611 | 0.672 | 0.733 | 0.794 | 0.855 | 0.916 | 0.977 | 1.039 | 1.100 |
| | 0.75 | 0.327 | 0.393 | 0.458 | 0.524 | 0.589 | 0.655 | 0.720 | 0.785 | 0.851 | 0.916 | 0.982 | 1.047 | 1.113 | 1.178 |
| | 0.80 | 0.349 | 0.419 | 0.489 | 0.559 | 0.628 | 0.698 | 0.768 | 0.838 | 0.908 | 0.977 | 1.047 | 1.117 | 1.187 | 1.257 |
| | 0.85 | 0.371 | 0.445 | 0.519 | 0.593 | 0.668 | 0.742 | 0.816 | 0.890 | 0.964 | 1.039 | 1.113 | 1.187 | 1.261 | 1.335 |
| | 0.90 | 0.393 | 0.471 | 0.550 | 0.628 | 0.707 | 0.785 | 0.864 | 0.943 | 1.021 | 1.100 | 1.178 | 1.257 | 1.335 | 1.414 |
| | 0.95 | 0.415 | 0.497 | 0.580 | 0.663 | 0.746 | 0.829 | 0.912 | 0.995 | 1.078 | 1.161 | 1.244 | 1.327 | 1.409 | 1.492 |
| | 1.00 | 0.436 | 0.524 | 0.611 | 0.698 | 0.785 | 0.873 | 0.960 | 1.047 | 1.135 | 1.222 | 1.309 | 1.396 | 1.484 | 1.571 |
| | 1.05 | 0.458 | 0.550 | 0.641 | 0.733 | 0.825 | 0.916 | 1.008 | 1.100 | 1.191 | 1.283 | 1.375 | 1.466 | 1.558 | 1.650 |
| | 1.10 | 0.480 | 0.576 | 0.672 | 0.768 | 0.864 | 0.960 | 1.056 | 1.152 | 1.248 | 1.344 | 1.440 | 1.536 | 1.632 | 1.728 |
| | 1.15 | 0.502 | 0.602 | 0.703 | 0.803 | 0.903 | 1.004 | 1.104 | 1.204 | 1.305 | 1.405 | 1.506 | 1.606 | 1.706 | 1.807 |
| | 1.20 | 0.524 | 0.628 | 0.733 | 0.838 | 0.943 | 1.047 | 1.152 | 1.257 | 1.362 | 1.466 | 1.571 | 1.676 | 1.780 | 1.885 |
| | 1.25 | 0.546 | 0.655 | 0.764 | 0.873 | 0.982 | 1.091 | 1.200 | 1.309 | 1.418 | 1.527 | 1.637 | 1.746 | 1.855 | 1.964 |

FIG. 8

WATCH COMPONENT AND WATCH

The present application is based on, and claims priority from JP Application Serial Number 2019-208553, filed Nov. 19, 2019, the disclosure of which is hereby incorporated by reference herein in its entirety.

BACKGROUND

1. Technical Field

The present disclosure relates to a watch component and a watch.

2. Related Art

As a watch component mounted in a watch, an escape wheel that includes a tooth portion configured to mesh with a pallet fork and controls rotation of wheels is known. In the escape wheel, a pallet stone of the pallet fork slides on the side surface of the tooth portion, and consequently wear is easily caused due to friction therebetween. Therefore, in order to reduce the friction as much as possible, it is necessary to retain lubricating oil between the pallet stone and the side surface.

For this reason, for example, JP-A-2017-203651 discloses a configuration in which an oil retaining groove extending along a circumference in a surface of a disc-shaped escape wheel and an oil supply groove connecting a side surface of a tooth portion and the retaining groove are provided, and lubricating oil is retained in the grooves.

In the configuration of JP-A-2017-203651, however, the oil retaining groove and the oil supply groove are provided in the surface of the escape wheel, and it is therefore difficult to supply, to the side surface of the tooth portion through the oil supply groove, the lubricating oil supplied to the oil retaining groove, thus making it difficult to retain a sufficient amount of the lubricating oil in the side surface.

SUMMARY

A watch component constitutes a drive mechanism of a watch, and includes a tooth portion, and a base mainly composed of silicon. A contact surface where the tooth portion makes contact with another component includes a recess.

In the watch component, a recess may be provided in side surfaces of the base and the tooth portion.

In the watch component, the recess may have a maximum depth of 0.02 μm to 1.20 μm in cross-sectional view.

In the watch component, the recess may have a maximum depth of 0.05 μm to 1.00 μm in cross-sectional view.

In the watch component, a maximum depth position of the recess may be a center portion in a thickness direction of the base or the tooth portion.

In the watch component, an angle between a side connecting the maximum depth position of the recess and an end portion of the base or the tooth portion, and a thickness direction of the recess may be 0.05° to 1.25° in cross-sectional view.

In the watch component, the recess may be formed by a Bosch process.

In the watch component, the watch component may be an escape wheel or a gear.

In the watch component, the other component may be a pallet fork or a gear.

A watch includes a watch movement including the above-described watch component, and a hand configured to be driven by the watch movement.

BRIEF DESCRIPTION OF THE DRAWINGS

FIG. 7 is a graph showing a relationship of oil retention and mechanical strength versus a maximum depth of a recess.

FIG. 8 is a graph showing the maximum depth of the recess calculated from a thickness of a base and an angle of the recess.

DESCRIPTION OF EXEMPLARY EMBODIMENTS

1. First Embodiment

Figure 1:
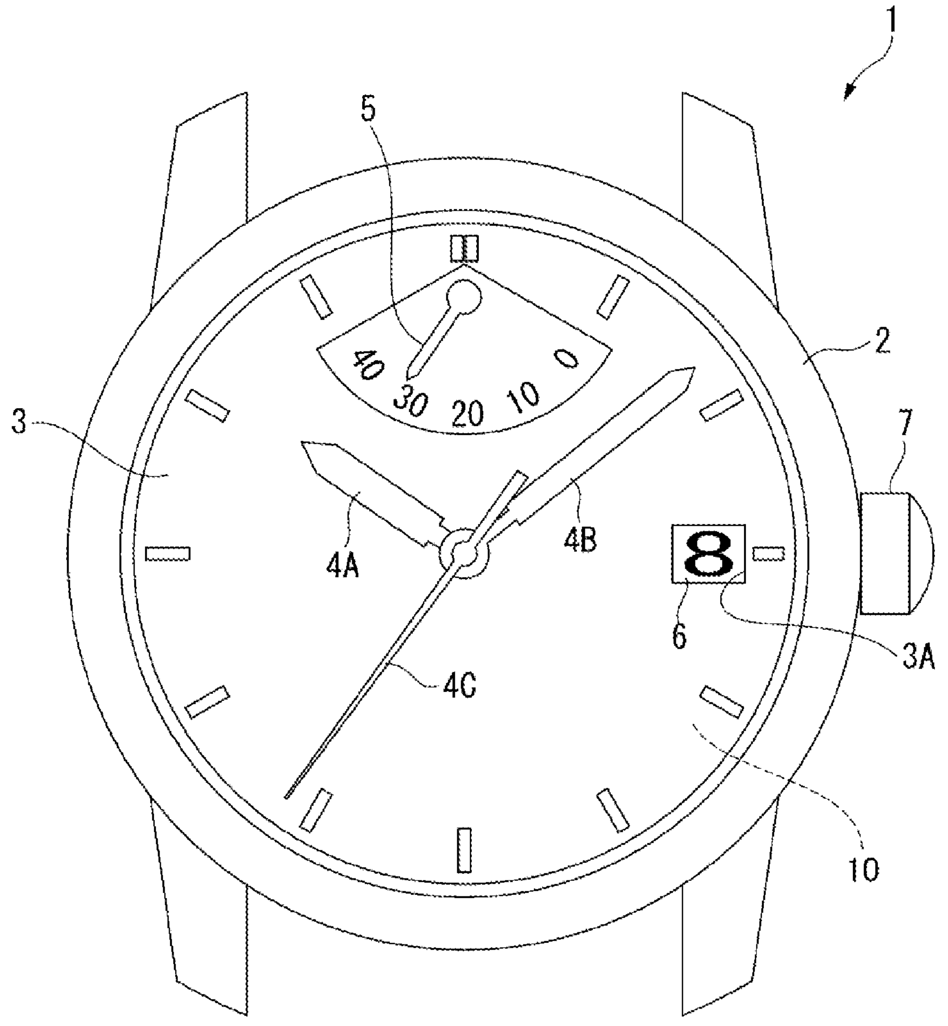
FIG. 1 is a front view of a mechanical watch according to a first embodiment.

A first embodiment is described below with reference to the accompanying drawings. Note that, in the first embodiment, a mechanical watch 1 is described as an example of a watch, an escape wheel 100 is described as an example of a watch component, and a pallet fork 140 is described as an example of another component. Note that the members in the drawings may not be illustrated to scale for the purpose of illustrating the members in recognizable sizes.

1.1 Mechanical Watch

First, the mechanical watch 1 serving as a watch according to a first embodiment is described.

FIG. 1 is a front view of the mechanical watch 1.

The mechanical watch 1 includes a cylindrical outer case 2, and a disc-shaped dial 3 is disposed on an inner circumferential side of the outer case 2. Of the two openings of the outer case 2, the opening on the front surface side is covered with a cover glass, and the opening on the back surface side is covered with a case back.

In addition, the mechanical watch 1 includes a movement 10 serving as a watch movement contained within the outer case 2, an hour hand 4A, a minute hand 4B and a second hand 4C that indicate time information, and a power reserve hand 5 that indicates a duration of a mainspring.

The hands such as the hour hand 4A, the minute hand 4B, the second hand 4C, and the power reserve hand 5 are attached to a hand pivot of the movement 10 and driven by the movement 10.

A day-date window 3A is provided in the dial 3, and a date indicator 6 is visible from the day-date window 3A.

A crown 7 is provided on a side surface of the outer case 2. The crown 7 can be pulled to two positions from a 0th position that is a normal position where the crown 7 is pushed to the center of the mechanical watch 1.

When the crown 7 is rotated at the 0th position, the mainspring can be wound up as described later. The power reserve hand 5 moves in conjunction with the winding of the mainspring. The mechanical watch 1 of this embodiment can ensure a duration of about 40 hours when the mainspring is fully wound up.

When the crown 7 is pulled to the first position and rotated, the date indicator 6 can be moved to adjust the date. When the crown 7 is pulled to the second position, the second hand 4C stops, and when the crown 7 is rotated at the second position, the hour hand 4A and the minute hand 4B can be moved to adjust the time.

1.2 Movement

Figure 2:
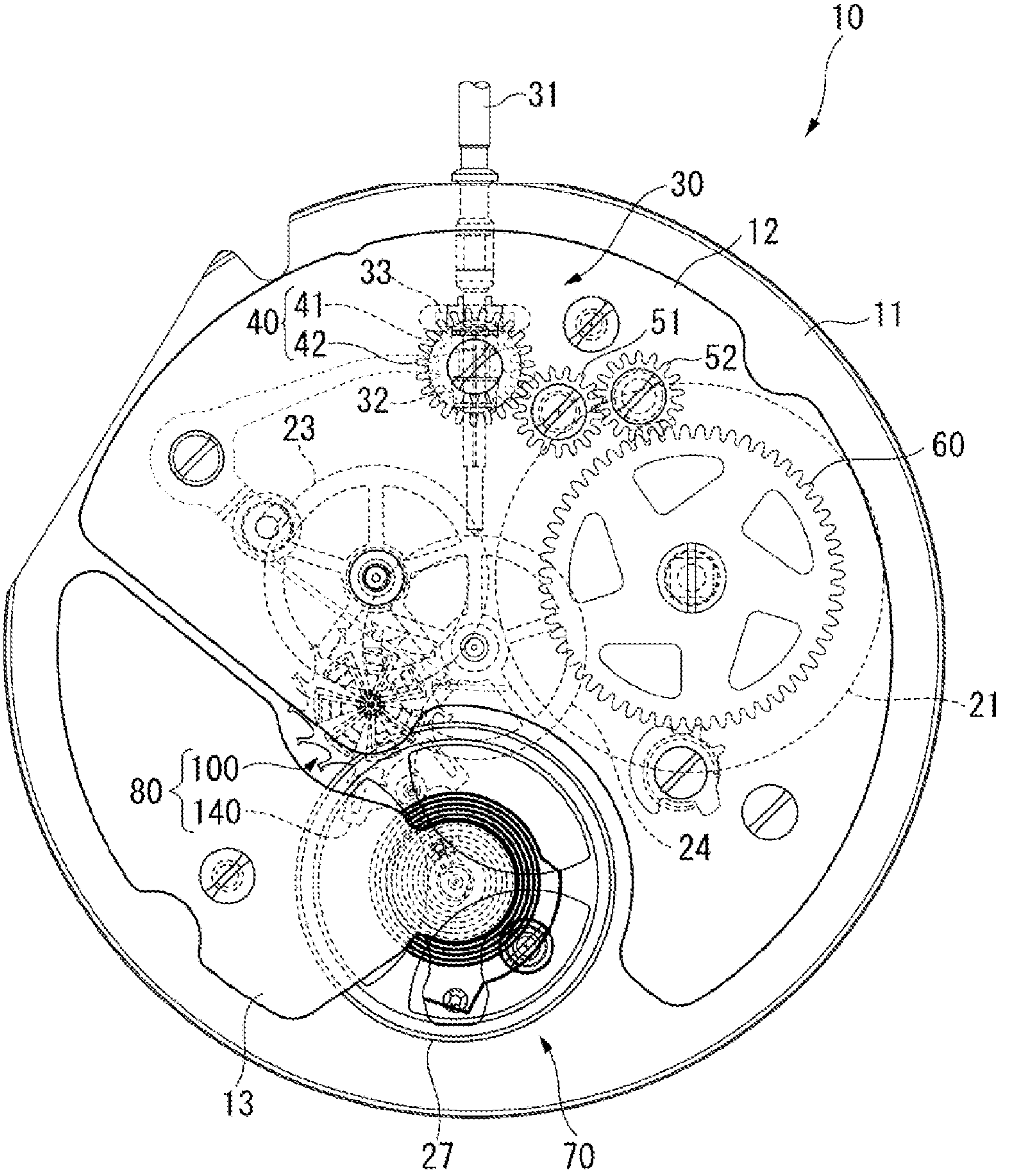
FIG. 2 is a plan view of a front side of a movement of the mechanical watch according to the first embodiment.

FIG. 2 is a plan view of the front side of the movement 10 of the mechanical watch 1. Note that the near side in FIG. 2, i.e., the case back side of a main plate 11 is referred to as a front side, and the depth side, i.e., the cover glass side of the main plate 11 is referred to as a back side.

The movement 10 includes the main plate 11, a barrel and train wheel bridge 12, and a balance bridge 13. The dial 3 illustrated in FIG. 1 is disposed on the back side of the main plate 11. Note that the wheel train incorporated on the front side of the movement 10 is referred to as a front wheel train, and the wheel train incorporated on the back side of the movement 10 is referred to as a back wheel train.

A movement barrel complete 21 serving as a first wheel in which the mainspring is housed, a second wheel (not illustrated), a third wheel 23, a fourth wheel 24, and an escape wheel 100 serving as a fifth wheel are disposed between the base plate 11 and the barrel and train wheel bridge 12. A pallet fork 140, a balance 27, and the like are disposed between the main plate 11 and the balance bridge 13. Note that the pallet fork 140 and the escape wheel 100 constitute an escapement 80, and the balance 27 constitutes a speed governor 70.

1.3 Hand Winding Mechanism

A hand winding mechanism 30 includes a winding stem 31, a clutch wheel 32, a winding pinion 33, a crown wheel 40, a first intermediate wheel 51, and a second intermediate wheel 52 rotatably supported at the barrel and train wheel bridge 12. The hand winding mechanism 30 transmits a rotation of the rotated crown 7 to a ratchet wheel 60 to rotate the ratchet wheel 60 and a barrel stem (not illustrated) and wind the mainspring. Note that the crown wheel 40 includes a first crown wheel 41 that meshes with the winding pinion 33, and a second crown wheel 42 that rotates together with the first crown wheel 41 and meshes with the first intermediate wheel 51.

1.4 Speed Governor

The speed governor 70 repeats a regular reciprocating rotational movement of the ring of the balance 27 with expansion and contraction of an isochronous hairspring or the like.

1.5 Escapement

Figure 3:
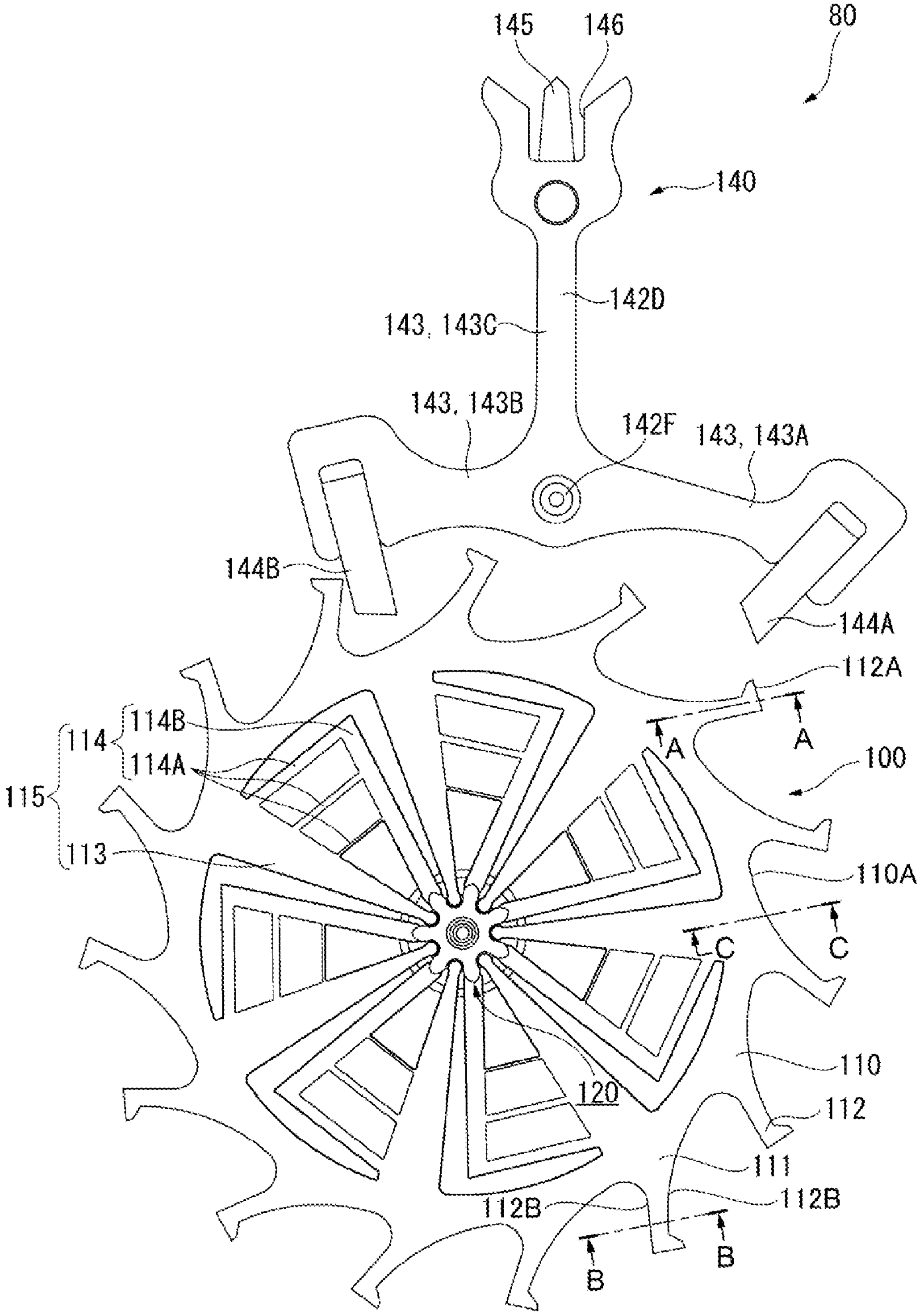
FIG. 3 is a plan view of an escapement according to the first embodiment.

FIG. 3 is a plan view of the escapement 80.

The escapement 80 includes the pallet fork 140 serving as another component and the escape wheel 100 serving as a watch component that constitutes the drive mechanism of the mechanical watch 1. The escapement 80 continuously provides the balance 27 with a force for reciprocation movement, and controls the wheel train with regular vibrations from the balance 27. Note that a plurality of tooth portions 112 of the escape wheel 100 makes contact with pallet stones 144A and 144B of the pallet fork 140.

Next, the pallet fork 140 and the escape wheel 100 that constitute the escapement 80 are described in detail with reference to FIGS. 3 to 8.

Figure 4:
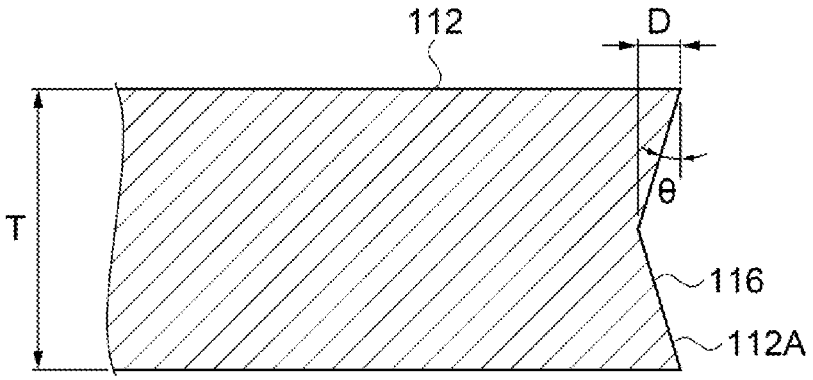
FIG. 4 is a cross-sectional view taken along a line A-A of FIG. 3.
Figure 5:
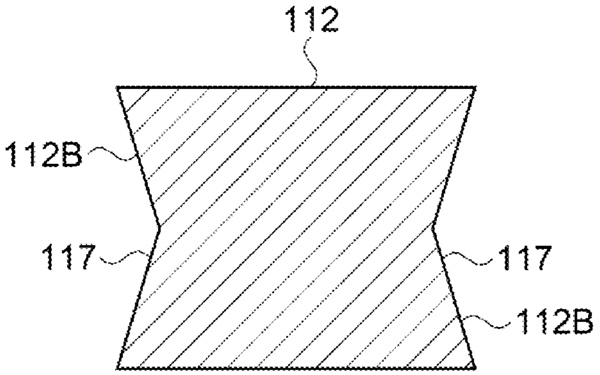
FIG. 5 is a cross-sectional view taken along a line B-B of FIG. 3.
Figure 6:
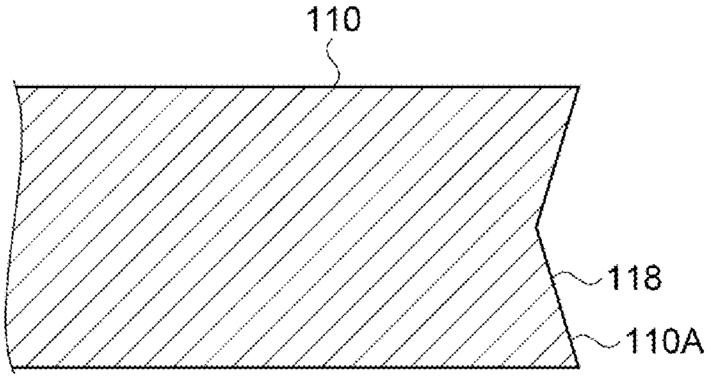
FIG. 6 is a cross-sectional view taken along a line C-C of FIG. 3.

FIG. 4 is a cross-sectional view taken along a line A-A in FIG. 3. FIG. 5 is a cross-sectional view taken along a line B-B in FIG. 3. FIG. 6 is a cross-sectional view taken along a line C-C in FIG. 3. FIG. 7 is a graph showing a relationship of oil retention and mechanical strength versus a maximum depth D of a recess 116. FIG. 8 is a graph showing the maximum depth D of the recess 116 calculated from a thickness T of a base 110 and an angle θ of the recess 116.

The pallet fork 140 includes a pallet body 142D and a pallet pivot 142F serving as a pivot as illustrated in FIG. 3. The pallet body 142D is formed in a T-shape with three pallet beams 143 composed of pallet arms 143A and 143B and a pallet lever 143C, and is configured to be rotatable with the pallet pivot 142F. Note that the pallet pivot 142F are rotatably supported at both ends with respect to the main plate 11 and a pallet bridge (not illustrated).

The pallet stones 144A and 144B are provided at the tips of the pallet arms 143A and 143B, which are two pallet beams 143 of the three pallet beams 143, and a tip end 145 is attached to the tip of the pallet lever 143C, which is the remaining one of the pallet beams 143. In addition, the tip of the pallet lever 143C is formed in a substantially U-shape in plan view, and the inner space thereof is a pallet space 146. Each of the pallet stones 144A and 144B is a ruby formed in a quadrangular prismatic shape and is bonded and fixed to the pallet beam 143 with an adhesive material or the like.

When the pallet fork 140 having the above-described configuration rotates about the pallet pivot 142F, the pallet stone 144A or the pallet stone 144B makes contact with a contact surface 112A of the tooth portion 112 of the escape wheel 100. In addition, at this time, the pallet lever 143C makes contact with a banking pin (not illustrated), and thus the pallet fork 140 is prevented from rotating any further in the same direction. As a result, the rotation of the escape wheel 100 is also temporarily stopped.

The escape wheel 100 has a disc shape with a uniform thickness in its entirety, and is made of silicon. Note that "made of silicon" means that the main constituent is silicon, and that, for example, 80 mass % or greater, preferably 90 mass % or greater of the entire escape wheel 100 is silicon. The type of the silicon is not particularly limited, and may be selected appropriately from the perspective of processability. Examples of the silicon include monocrystalline silicon and polycrystalline silicon. They may be used alone or in combination.

The escape wheel 100 made of silicon can be manufactured by, for example, photolithography technology or etching technology, and can have excellent processing accuracy.

Note that the base material of the escape wheel 100 may be a nickel silver (alloys of copper, nickel, and zinc), carbon steel, nickel, sapphire, silicon carbide (SiC), silicon nitride ($Si_3N_4$), quartz ($SiO_2$), or diamond, as well as silicon.

The escape wheel 100 includes an insertion hole through which a pivot member 120 is inserted at the center portion. By inserting the pivot member 120 through the insertion hole, the escape wheel 100 is held rotatably around the pivot member 120.

The escape wheel 100 is composed of a base 110 including a rim portion 111 having the plurality of tooth portions 112 and a holding portion 115 that holds the pivot member 120. The rim portion 111 is an annular portion of an outer edge of the escape wheel 100. The tooth portion 112 protrudes outward from the outer periphery of the rim portion 111 and is formed in a special hook shape. As illustrated in FIG. 3, the pallet stones 144A and 144B of the pallet fork 140 make contact with the contact surfaces 112A of the plurality of tooth portions 112.

The holding portion 115 is disposed on the pivot member 120 side relative to the rim portion 111. In this embodiment, the escape wheel 100 includes seven holding portions 115. The holding portions 115 are disposed at seven locations at an even pitch of 360°/7 in the circumferential direction of the annular rim portion 111. Note that the number of holding portions 115 may be three to seven or may be seven or more, and is not particularly limited.

The holding portion 115 includes a first holding portion 113 extending from the rim portion 111, and a second holding portion 114 branched from the first holding portion 113. The first holding portion 113, the second holding portion 114 including a first portion 114A and a second portion 114B, and the rim portion 111 are integrally formed of silicon of the same material.

Note that a plurality of the first portions 114A functions to reduce a stress applied in the extending direction of the second portion 114B with respect to the second portion 114B.

In addition, when an external force is applied to the escape wheel 100, the first portion 114A is easily deformed in the extending direction of the second portion 114B, and thus the pivot member 120 can be held at the center of the escape wheel 100. In addition, since the external force applied to the escape wheel 100 can be reduced by deflection of the plurality of first portions 114A, damage to the escape wheel 100 can be suppressed.

The plurality of tooth portions 112 of the escape wheel 100 makes contact with the pallet stones 144A and 144B of the pallet fork 140, and as such are easily worn due to friction caused therebetween. For this reason, the recess 116 recessed to the main body direction of the tooth portion 112 is provided in the contact surface 112A of the tooth portion 112 as illustrated in FIG. 4. With the recess 116 provided in the contact surface 112A, lubricating oil can be retained in the recess 116, and wear of the tooth portion 112 can be reduced by reducing the friction with the pallet stones 144A and 144B of the pallet fork 140. Note that the contact surface 112A includes not only the tip of the tooth portion 112, but also a portion of a side surface 112B of the tooth portion 112.

In addition, as illustrated in FIGS. 5 and 6, a recess 117 is provided in the side surface 112B of the tooth portion 112, and a recess 118 is provided in a side surface 110A of the base 110. The recess 117 and the recess 118 are an example of a second recess. Note that the recess 116 of the contact surface 112A, the recess 117 of the tooth portion 112, and the recess 118 of the base 110 have substantially the same shape in manufacture and are connected to each other, and thus the lubricating oil retained in the recess 117 and the recess 118 can be supplied to the recess 116 of the contact surface 112A.

In the cross-sectional view, the maximum depth D of the recesses 116, 117 and 118 is related to the oil retention of the lubricating oil and the mechanical strength of the escape wheel 100. Therefore, results of examination on the maximum depth D, oil retention, and mechanical strength are shown in FIG. 7. Here, in FIG. 7, "A" indicates very good oil retention, "B" indicates good oil retention, and "C" indicates poor oil retention. In addition, "E" indicates very good mechanical strength, "F" indicates good mechanical strength, and "G" indicates poor mechanical strength. From FIG. 7, the maximum depth D of the recesses 116, 117 and 118 of the escape wheel 100 having excellent oil retention of lubricating oil and good mechanical strength is preferably 0.02 μm to 1.20 μm, more preferably 0.05 μm to 1.00 μm.

In addition, in cross-sectional view, the maximum depth position of the recesses 116, 117 and 118 is the center portion in the thickness direction of the base 110 or the tooth portion 112. Thus, a sufficient amount of lubricating oil can be retained at the center portion, and even when the contact surface 112A of the tooth portion 112 and the pallet fork 140 obliquely make contact with each other, it is easy to reliably retain the lubricating oil in the contact surface 112A. Note that the center portion is a location where the etching condition is switched in the manufacturing process described later, or more specifically, a location where the condition is switched from an etching-rich condition to a deposition-rich condition, or, a position of $(T/2)\pm10\%$, where T represents the thickness and manufacturing errors are taken into consideration.

In addition, FIG. 8 shows the maximum depth D of the recesses 116, 117 and 118 calculated from an equation $D=0.5\times T\times\tan\theta$, where θ is an angle between the side connecting the maximum depth position of the recesses 116, 117 and 118 and the end of the base 110 or the tooth portion 112 and the thickness direction of the recesses 116, 117 and 118, and T is a thickness of the base 110 or the tooth portion 112 in cross-sectional view. From FIG. 8, the escape wheel 100 having excellent oil retention and mechanical strength can be obtained by selecting the thickness T of the base 110 or the tooth portion 112 with an angle θ of 0.05° to 1.25° and a maximum depth D of 0.02 μm to 1.20 μm, or 0.05 μm to 1.00 μm.

Note that the escape wheel 100 is described as an example of the watch component in this embodiment, but the present disclosure is not limited thereto, and the watch component may be a gear. When a recess is provided in the gear in the contact surface with another component, a sufficient amount of lubricating oil can be retained in the recesses. Thus, friction with another component is reduced, and wear of the gear can be reduced.

Note that the pallet fork 140 is described as an example of another component in this embodiment, but the present disclosure is not limited thereto, and another component may be a gear. Since a recess is provided in the contact surface of the watch component and a sufficient amount of lubricating oil is retained, friction with the watch component is reduced, and wear of the gear can be reduced.

As described above, the mechanical watch 1 according to this embodiment includes the movement 10 including the escape wheel 100 provided with the recess 116 in the contact surface 112A, and a hand such as the hour hand 4A driven by the movement 10. Thus, lubricating oil can be retained in the recess 116 of the contact surface 112A, and a high performance mechanical watch 1 can be provided by reducing friction with the pallet fork 140.

2. Manufacturing Method of Watch Component

Next, an example of a method of manufacturing the escape wheel 100 serving as the watch component according to the first embodiment is described with reference to FIGS. 9 to 15.

Figure 9:
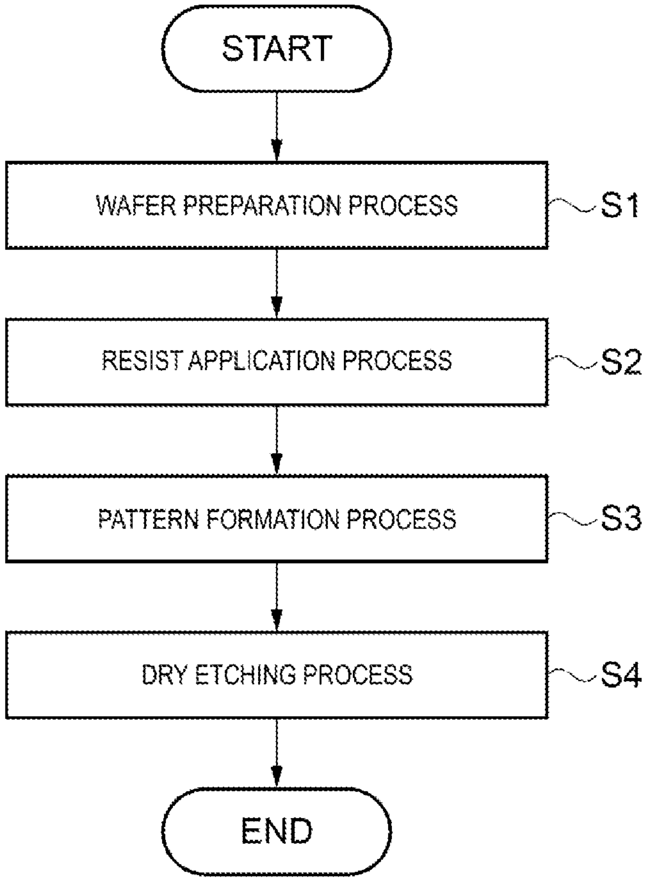
FIG. 9 is a flowchart illustrating a main manufacturing process of a watch component according to the first embodiment.
Figure 14:
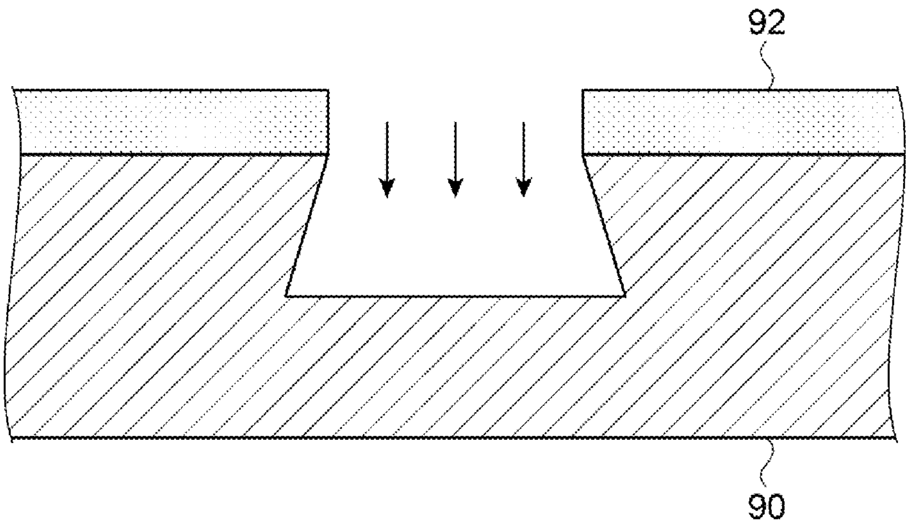
FIG. 14 is a cross-sectional view illustrating a dry etching process.
Figure 15:
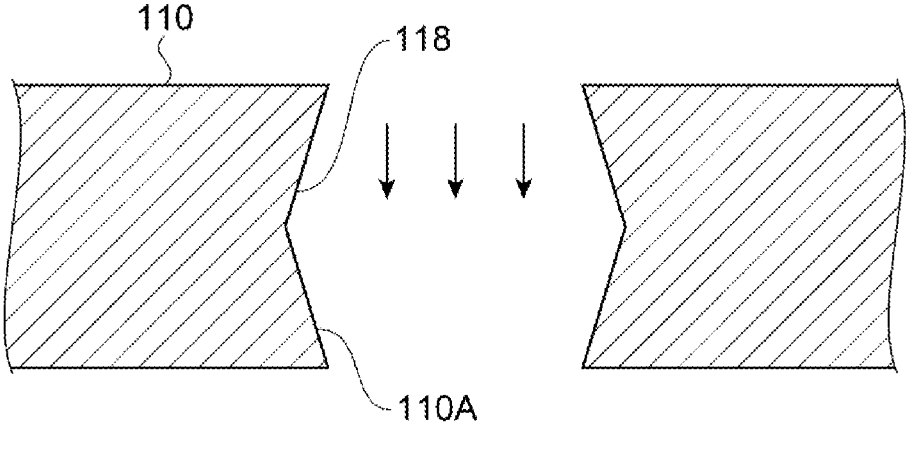
FIG. 15 is a cross-sectional view illustrating a dry etching process.

FIG. 9 is a flowchart illustrating a main manufacturing process of the escape wheel 100 according to the first embodiment. FIGS. 10 to 13 are cross-sectional views illustrating a manufacturing process of the escape wheel 100. FIGS. 14 and 15 are cross-sectional views illustrating a dry etching process.

As illustrated in FIG. 9, the method of manufacturing the escape wheel 100 includes a wafer preparation process of preparing a wafer 90, a resist application process, a pattern formation process of patterning the shape of the escape wheel 100, and a dry etching process of processing the outer shape of the escape wheel 100.

2.1 Wafer Preparation Process

Figure 10:
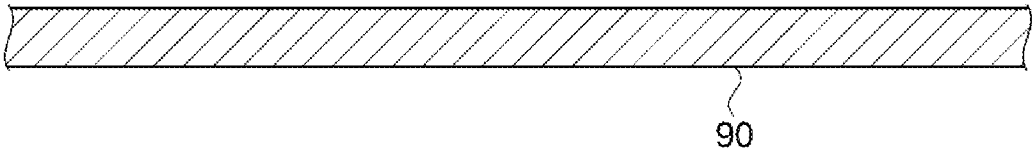
FIG. 10 is a cross-sectional view illustrating a manufacturing process of the watch component.

First, at step S1, the wafer 90 made of silicon such as monocrystalline silicon and polycrystalline silicon that enables collective formation of a plurality of the escape wheels 100 is prepared as illustrated in FIG. 10.

2.2 Resist Application Process

Figure 11:
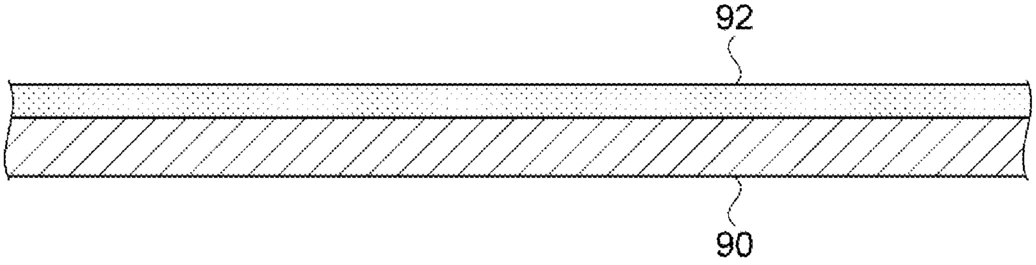
FIG. 11 is a cross-sectional view illustrating a manufacturing process of the watch component.

Next, at step S2, a resist 92 is applied on the wafer 90 as illustrated in FIG. 11.

2.3 Pattern Formation Process

Figure 12:
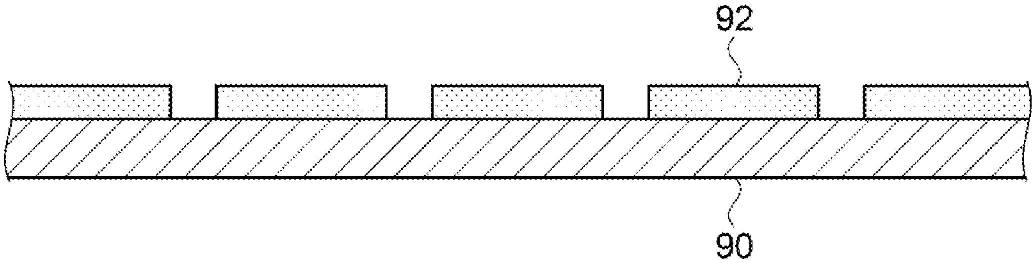
FIG. 12 is a cross-sectional view illustrating a manufacturing process of the watch component.

Next, at step S3, the outer shape pattern of the escape wheel 100 is patterned by photolithographic technology as illustrated in FIG. 12.

2.4 Dry Etching Process

Figure 13:
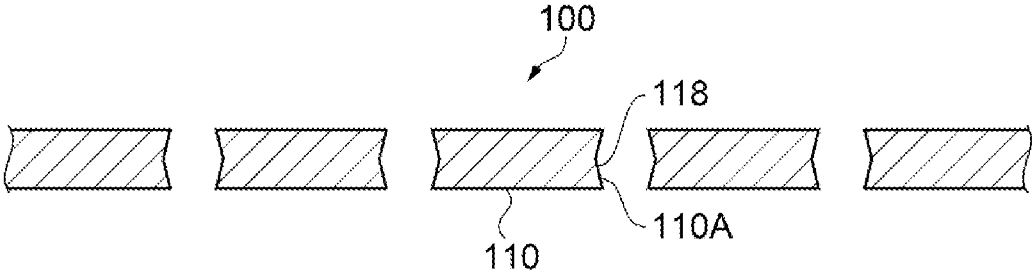
FIG. 13 is a cross-sectional view illustrating a manufacturing process of the watch component.

Next, at step S4, the region not protected by the resist 92 is dry etched to form the escape wheel 100 including the recess 118 in the side surface 110A of the base 110 as illustrated in FIG. 13.

Here, the wafer 90 is processed by a dry etching process such as a Bosch process using a reactive ion etching (RIE) apparatus that can substantially vertically process the silicon by repeating etching and deposition. First, at an initial phase of the etching, processing is carried out under an etching-rich condition until a predetermined thickness, e.g., one-half of the plate thickness, and then the processing proceeds under a deposition-rich condition. As a result, as illustrated in FIG. 14, since the etching-rich condition is used until one-half of the plate thickness, the processing is carried out such that the side surface of the processed wafer 90 is scooped as etching proceeds. In addition, since the processing is thereafter carried out under the deposition-rich condition, the processing is carried out such that the side surface of the processed wafer 90 is left as the etching proceeds as illustrated in FIG. 15. Accordingly, the recesses 116, 117 and 118 can be formed in the contact surface 112A of the tooth portion 112, the side surface 112B of the tooth portion 112, and the side surface 110A of the base 110.

Note that examples of the switching from the etching-rich condition to the deposition-rich condition may include reduction of the ratio (Te/Td) of an etching time Te to a deposition time Td, and reduction of the coil power ratio (Pe/Pd) between the etching time Pe and the deposition time Pd.

Through the processes described above, the escape wheel 100 in which the recesses 116, 117 and 118 are provided in the contact surface 112A of the tooth portion 112, the side surface 112B of the tooth portion 112, and the side surface 110A of the base 110 according to this embodiment according to this embodiment is obtained.

Note that the method of manufacturing the escape wheel 100 serving as the watch component according to this embodiment may include a process other than the above-described processes.

As described above, by using a dry etching process such as a Bosch process for etching under the etching-rich condition and the deposition-rich condition in the manufacturing process of the escape wheel 100, the recess 116 can be formed with high accuracy in the contact surface 112A of the escape wheel 100.

3. Second Embodiment

Next, a mechanical watch according to a second embodiment is described. Note that configurations similar to those of the first embodiment are denoted with the same reference signs and description thereof is omitted.

Figure 16:
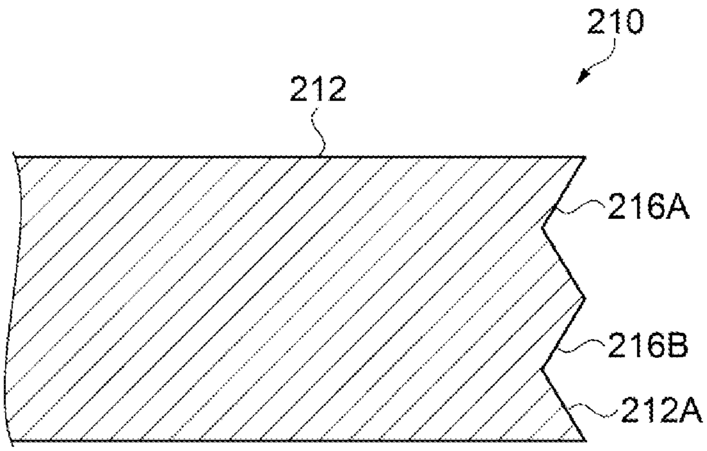
FIG. 16 is a cross-sectional view of a watch component according to a second embodiment.

The mechanical watch according to the second embodiment has a configuration identical to that of the mechanical watch 1 according to the first embodiment except that an escape wheel 210 illustrated in FIG. 16 is used as a watch component.

FIG. 16 is a cross-sectional view of the escape wheel 210 serving as a watch component according to the second embodiment.

In the escape wheel 210, two recesses 216A and 216B are provided in a contact surface 212A of the tooth portion 212 in the thickness direction. For the two recesses 216A and 216B, the recess 216A is formed such that processing is first carried out under the etching-rich condition until ¼ of the plate thickness, and then the processing is carried out under the deposition-rich condition until one-half of the plate thickness. Thereafter, the processing is carried out under the etching-rich condition until ¾ of the plate thickness, and finally the processing is carrying out under the deposition-rich condition. In this manner, the recess 216B can be formed.

With the above-described configuration, effects similar to those of the first embodiment may be achieved. Therefore, a watch component that achieves excellent oil retention and reduced friction with another component can be obtained.

Contents derived from the embodiments are described below.

A watch component constitutes a drive mechanism of a watch, and includes a tooth portion, and a base mainly composed of silicon. A contact surface where the tooth portion makes contact with another component includes a recess.

According to this configuration, since the contact surface where the tooth portion makes contact with another component includes the recess, it is possible to retain a sufficient amount of lubricating oil in the recess of the contact surface. Thus, friction with another component is reduced and wear of the tooth portion can be reduced.

In the watch component, a recess may be provided in side surfaces of the base and the tooth portion.

According to this configuration, since the recess is provided in the side surfaces of the tooth portions and the base, a sufficient amount of lubricating oil can be retained in each recess, and a sufficient amount of lubricating oil can be supplied to the recess of the contact surface.

In the watch component, the recess may have a maximum depth of 0.02 μm to 1.20 μm in cross-sectional view.

According to this configuration, since the maximum depth of the recess is 0.02 μm to 1.20 μm, it is possible to retain a sufficient amount of lubricating oil in the recess of the contact surface while maintaining the mechanical strength.

In the watch component, the recess may have a maximum depth of 0.05 μm to 1.00 μm in cross-sectional view.

According to this configuration, since the maximum depth of the recess is 0.05 μm to 1.00 μm, it is possible to retain a sufficient amount of lubricating oil in the recess of the contact surface while maintaining the mechanical strength.

In the watch component, a maximum depth position of the recess may be a center portion in a thickness direction of the base or the tooth portion.

According to this configuration, since the maximum depth position of the recess is the center portion in the thickness direction of the base or tooth portion, a sufficient amount of lubricating oil can be retained at the center portion in the thickness direction of the base or tooth portion. In addition, even when the contact surface of the tooth portion and another component obliquely make contact with each other, it is easy to reliably retain the lubricating oil in the contact surface.

In the watch component, an angle between a side connecting the maximum depth position of the recess and an end portion of the base or the tooth portion, and a thickness direction of the recess may be 0.05° to 1.25° in cross-sectional view.

According to this configuration, since the angle between the side connecting the maximum depth position of the recess and the end portion of the base or the tooth portion, and the thickness direction of the recess is 0.05° to 1.25°, a sufficient amount of lubricating oil can be retained in the recess of the contact surface while maintaining the mechanical strength.

In the watch component, the recess may be formed by a dry etching process.

According to this configuration, by using a dry etching process such as a Bosch process for etching under the etching-rich condition and the deposition-rich condition, the recess can be formed with high accuracy in the contact surface of the watch component.

In the watch component, the watch component may be an escape wheel or a gear.

According to this configuration, it is possible to reduce wear of another component that makes contact with the gear or the escape wheel in which a sufficient amount of lubricating oil is retained in the recess of the contact surface.

In the watch component, the other component may be a pallet fork or a gear.

According to this configuration, since it makes contact with the watch component that retains a sufficient amount of lubricating oil in the recess of the contact surface, it is possible to reduce wear of the pallet fork or gear.

A watch includes a watch movement including the above-described watch component, and a hand configured to be driven by the watch movement.

According to this configuration, since the watch component that achieves reduced friction with another component is provided, it is possible to provide a high performance watch.

What is claimed is:

1. A watch component that constitutes a drive mechanism of a watch, the watch component comprising:

a tooth portion; and a base mainly composed of silicon, wherein the tooth portion and the base each include an upper surface and an opposite lower surface, and a contact surface extends in a thickness direction between the upper surface and the opposite lower surface, the contact surface is where the tooth portion makes contact with another component, and includes a recess having a maximum depth of 0.02 μm to 1.20 μm in cross-sectional view, a maximum depth position of the recess is located at a center portion of the contact surface in the thickness direction of the base or the tooth portion, and the recess is defined by a first angled planar surface that extends from the upper surface to the center portion and an angled second planar surface that extends from the center portion to the opposite lower surface.

2. The watch component according to claim 1, wherein a second recess is provided in side surfaces of the base and the tooth portion.

3. The watch component according to claim 1, wherein the recess has a maximum depth of 0.05 μm to 1.00 μm in cross-sectional view.

4. The watch component according to claim 2, wherein the second recess has a maximum depth of 0.05 μm to 1.00 μm in cross-sectional view.

5. The watch component according to claim 2, wherein the tooth portion and the base each include an upper surface and an opposite lower surface, and the side surfaces each extend in a thickness direction between the upper surface and the opposite lower surface, and a maximum depth position of the second recess is located at a center portion of each of the side surfaces in the thickness direction of the base or the tooth portion.

6. The watch component according to claim 4, wherein the tooth portion and the base each include an upper surface and an opposite lower surface, and the side surfaces each extend in a thickness direction between the upper surface and the opposite lower surface, and a maximum depth position of the second recess is located at a center portion of each of the side surfaces in the thickness direction of the base or the tooth portion.

7. The watch component according to claim 1, wherein an angle between a side connecting the maximum depth position of the recess and an end portion of the base or the tooth portion, and a thickness direction of the recess is 0.05° to 1.25° in cross-sectional view.

8. The watch component according to claim 5, wherein an angle between a side connecting the maximum depth position of the second recess and an end portion of the base or the tooth portion, and a thickness direction of the recess is 0.05° to 1.25° in cross-sectional view.

9. The watch component according to claim 1, wherein the recess is formed by a dry etching process.

10. The watch component according to claim 1, wherein the watch component is an escape wheel or a gear.

11. The watch component according to claim 1, wherein the watch component is an escape wheel or a gear.

12. The watch component according to claim 7, wherein the watch component is an escape wheel or a gear.

13. The watch component according to claim 10, wherein the other component is a pallet fork or a gear.

14. The watch component according to claim 11, wherein the other component is a pallet fork or a gear.

15. The watch component according to claim 2, wherein the recess and the second recess are connected to each other.

16. A watch comprising:

a watch movement including the watch component according to claim 1; and a hand configured to be driven by the watch movement.

17. A watch component that constitutes a drive mechanism of a watch, the watch component comprising:

a tooth portion; and a base mainly composed of silicon, wherein the tooth portion and the base each include an upper surface and an opposite lower surface, and a contact surface extends in a thickness direction between the upper surface and the opposite lower surface, the contact surface of the tooth portion is configured to make contact with another component, and the contact surface includes a recess having a maximum depth in the range of 0.02 μm to 1.20 μm in a cross-sectional view, and the tooth portion and the recess are simultaneously formed on the base by a dry etching process.

18. The watch component according to claim 17, wherein in the dry etching process, the recess is formed by switching between an etching-rich condition and a deposition-rich condition.

* * * * *